United States Patent
Ren et al.

(10) Patent No.: US 9,255,020 B2
(45) Date of Patent: Feb. 9, 2016

(54) DEVICE AND METHOD FOR SEWAGE TREATMENT USING VARIABLE MAGNETIC FIELD

(71) Applicant: Nanjing University, Nanjing (CN)

(72) Inventors: Hongqiang Ren, Nanjing (CN); Chuan Niu, Nanjing (CN); Jinju Geng, Nanjing (CN); Ke Xu, Nanjing (CN)

(73) Assignee: Nanjing University, Nanjing (CN)

( * ) Notice: Subject to any disclaimer, the term of this patent is extended or adjusted under 35 U.S.C. 154(b) by 266 days.

(21) Appl. No.: 13/923,345

(22) Filed: Jun. 20, 2013

(65) Prior Publication Data

US 2014/0138310 A1 May 22, 2014

(30) Foreign Application Priority Data

Nov. 22, 2012 (CN) .......................... 2012 1 0475408

(51) Int. Cl.
| | |
|---|---|
| *C02F 1/48* | (2006.01) |
| *B01D 59/48* | (2006.01) |
| *C02F 3/08* | (2006.01) |
| *C02F 3/10* | (2006.01) |
| *C02F 3/00* | (2006.01) |

(52) U.S. Cl.
CPC ................. *C02F 3/085* (2013.01); *C02F 1/485* (2013.01); *C02F 3/107* (2013.01); *C02F 2003/001* (2013.01); *C02F 2305/12* (2013.01); *Y02W 10/15* (2015.05)

(58) Field of Classification Search
CPC .... B01D 21/0009; B01D 35/06; C12N 13/00; C02F 1/484; C02F 1/158; C02F 1/48; C02F 1/488; C02F 2201/483; B03C 1/00; B03C 1/0335; B03C 2201/18
USPC ..................... 210/695, 222, 167.29
See application file for complete search history.

(56) References Cited

U.S. PATENT DOCUMENTS 3,014,189 A * 12/1961 MacKinnon et al. ........... 336/87
2005/0016633 A1* 1/2005 Kugai et al. ................... 148/105
(Continued)

FOREIGN PATENT DOCUMENTS

CN 101423272 * 11/2010

OTHER PUBLICATIONS

English Machine Translation, Duan et al, CN101423272, 2010, pp. 1-4.*
(Continued)

*Primary Examiner* — Nam Nguyen
*Assistant Examiner* — Claire Norris
(74) *Attorney, Agent, or Firm* — Matthias Scholl, PC; Matthias Scholl

(57) ABSTRACT

A device for sewage treatment including a reactor and a magnetic field generator. The reactor includes a water inlet at the upper end, a water outlet on the side wall, and a sludge outlet at the lower end. A stirrer and an aeration device are disposed in the reactor. The reactor is filled with magnetic powder and activated sludge. The magnetic field generator includes a magnetic field tester, an iron cover, a power supply, a transformer, and a spiral coil. The spiral coil loops around the outer surface of the reactor. The transformer, the spiral coil, and the power supply are connected in sequence. The iron cover surrounds the periphery and the bottom of the reactor, and the magnetic field tester is disposed within the reactor. A method for sewage treatment using the device is also provided.

4 Claims, 2 Drawing Sheets

(56) References Cited

U.S. PATENT DOCUMENTS

| | | | |
|---|---|---|---|
| 2007/0039894 A1* | 2/2007 | Cort | 210/695 |
| 2007/0110648 A1* | 5/2007 | Nickels et al. | 423/138 |
| 2008/0182309 A1* | 7/2008 | Vlad | 435/161 |

OTHER PUBLICATIONS

Yavuz et al, "Effects of magnetic field on activity of activated sludge in wastewater treatment," Enzyme and Microbial Technology 26, 2000, pp. 22-27.*

Sakai et al, "Simultaneous Removal of Organic and Nitrogen Compounds in Intermittently Aerated Activated Sludge Process Using Magnetic Separation," Wat. Res. vol. 30 No. 8, 1997, pp. 2113-2116.*

Tomska et al, "Enhancement of biological wastewater treatment by magnetic field exposure,", Desalination 222, 2008, pp. 368-373.*

* cited by examiner

DEVICE AND METHOD FOR SEWAGE TREATMENT USING VARIABLE MAGNETIC FIELD

CROSS-REFERENCE TO RELATED APPLICATIONS

Pursuant to 35 U.S.C. §119 and the Paris Convention Treaty, this application claims the benefit of Chinese Patent Application No. 201210475408.5 filed Nov. 22, 2012, the contents of which, are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of industrial wastewater purification, and more particularly to a device and a method for sewage treatment using variable magnetic field. The device and method are especially suitable in low temperature conditions for strengthening the biological treatment of the food industry wastewater.

2. Description of the Related Art

Biological treatment of food industry wastewater is typically adopted. However, temperature has an influence on the growth, reproduction, metabolism, species distribution and population size of microorganisms, which further affects the sewage treatment efficiency. In addition, the temperature has a great influence on the flocculation properties of activated sludge and viscosity of wastewater.

With the increasing strictness of sewage treatment standards, conventional methods for food industry wastewater treatment cannot meet the requirements. Particularly, under low temperature conditions, the metabolism ability of the microbe decreases, so does the chemical reaction rate. Thus, the biological treatment of wastewater runs at a low efficiency.

Studies show that a certain magnetic field strength can improve the removal rate of water pollutants chemical oxygen demand (COD), ammonia nitrogen and nitrate nitrogen. Specifically, the magnetic field strength of between 90 and 120 mT can improve COD removal efficiency significantly and the strength of between 30 and 60 mT can promote removal of ammonia nitrogen. The magnetic field also has an obvious effect on the aerobic denitrification process. Within the range of between 0 and 150 mT, the increase of the magnetic field strength improves the nitrate nitrogen removal. However, combining low temperature and magnetic field to treat food industry wastewater has not yet been reported.

SUMMARY OF THE INVENTION

In view of the above-described problems that under low temperature, conventional reactors have an unstable running and a low reaction efficiency thereby discharging disqualified effluent, it is one objective of the invention to provide a device and a method of sewage treatment using variable magnetic field. The method and device employ a magnetic field-magnetic powder-microorganism enhancing system, in which the microbial activity is improved by means of magnetic biological effect, and the mass transfer efficiency is enhanced by the drive of the magnetic force. Thus, the disadvantages of unstable running of reactors and low degradation rate of organic matters in conventional wastewater treatment under low temperature are overcome.

In the magnetic field-magnetic powder-microorganism system, the magnetic powder is mixed and flocculates with activated sludge to yield a compact sludge structure. The magnetic powder has a big specific gravity and so the activated sludge has better sedimentation performance. By applying an external variable magnetic field, magnetic force is formed in the reactor. The magnetic force accelerates the movement of the sludge floccules, which is a combination of charged particles and magnetic powder, thereby improving the mass transfer rate. The spiral coil and magnetic powder both produce magnetic biological effects on microbes in the reactor. Due to the presence of transition metal ions in microorganism enzyme active center, the magnetic field effect causes the enzyme active center to be exposed or encircled, thereby deforming or distorting the enzyme conformation of the molecule, i.e., changing the enzyme activity. Additionally, in the magnetic field, water osmotic pressure and cell membrane permeability are enhanced, which is conducive to nutrient absorption of microorganism. And the magnetic field can improve the solubility of oxygen, which benefits the degradation of small molecule organic matters into nutrients comprising carbon and nitrogen to provide nutrients for the growth of microorganisms. In the invention, by applying weak variable magnetic field (50-300 mT) on the microorganism sludge zone, biochemical reactions, magnetic biological effects and magnetic force movements occur simultaneously in the reaction zone, thereby strengthening the microorganism degradation of organic matter.

To achieve the above objective, in accordance with one embodiment of the invention, there is provided a device for sewage treatment comprising a reactor and a magnetic field generator which is disposed at a periphery of the reactor. The reactor comprises an upper end, a side wall, a lower end, and a bottom. The reactor further comprises a water inlet at the upper end, a water outlet on the side wall, and a sludge outlet at the lower end. A stirrer and an aeration device are disposed in the reactor. The reactor is filled with magnetic powder and activated sludge. The magnetic field generator comprises a magnetic field tester, iron cover, power supply, transformer, and spiral coil. The spiral coil loops around an outer surface of the reactor. The transformer, the spiral coil, and the power supply are connected in sequence. The iron cover surrounds the periphery and a bottom of the reactor, and the magnetic field tester is disposed within the reactor. A variable magnetic field is simulated in the reactor center by controlling the current intensity and direction in the spiral coil. The iron cover plays a protective role, weakening magnetic disturbance to facilities other than the reactor. The magnetic field tester is used for detecting the magnetic field strength inside the reactor.

In a class of this embodiment, the spiral coil is made of copper.

A method of sewage treatment using the device, comprises the steps of:

a) disposing the magnetic field generator at the periphery of the reactor and placing the reactor into the spiral coil of the magnetic field generator, and allowing the power supply to be an off-state;

b) placing the activated sludge having a concentration of between 4000 and 5000 mg/L and the magnetic powder in the reactor at a temperature of between 4 and 15° C., the addition amount of the magnetic powder being 0.5-1.2 g/L, introducing simulated food industry wastewater having an organic load of 0.05 kg/(m$^3$·d) into the reactor, and aerating and stirring the reactor to yield a flocculent mixture of the activated sludge and the magnetic powder;

c) culturing the flocculent mixture of the activated sludge and the magnetic powder for 15-20 d, switching on the power supply, adjusting the transformer to produce variable currents in the spiral coil and obtain a variable magnetic field in the reactor; controlling the magnetic field to rise and fall periodically at a constant rate within the range of between 50 and 300 mT, and gradually increasing the organic load of the simulated food industry wastewater to be between 1.0 and 1.5 kg/(m$^3$·d) for the acclimation of the activated sludge; and d) acclimating the activated sludge in the reactor for 30-40 d to achieve a stable running state, introducing food industry wastewater filtered through a grille into the reactor, and controlling the organic load of the food industry wastewater at between 1.0 and 2.0 kg/(m$^3$·d) to form an intensified sewage treatment system comprising the magnetic field, the magnetic powder, and microorganisms.

In a class of this embodiment, the magnetic powder is prepared by selecting magnetite $Fe_3O_4$ as a magnetic seed, finely grinding the magnetic seed to have a particle size less than 10 microns, and purifying the magnetic seed to have a purity exceeding 99% using a weak magnetic separator.

Advantages of the invention are summarized below:

(1) In the device of the invention, the reactor is filled with the magnetic powder and activated sludge, and spiral coil with current circle evenly around the outer surface of the reactor to form a magnetic field-magnetic powder-microorganism strengthening system. The system improves microorganism activity by means of the magnetic biological effect. The magnetic powder is mixed and flocculates with the activated sludge to yield a compact sludge structure, and thus the sedimentation performance of the activated sludge at low temperature is improved, so is the degradation rate of food industry wastewater in the reactor.

(2) The spiral coil is disposed outside the reactor, and the current flows through the spiral coil to form a magnetic field affecting the microorganism protein active sites in enzymes, thus improving the enzyme activity, especially compensating enzyme activity under low temperature conditions, and increasing microorganism biological reaction rates. The magnetic force accelerates the movement of the sludge floccules, which is a combination of charged particles and the magnetic powder, thereby improving the mass transfer rate.

(3) The method of sewage treatment of the invention comprises first acclimating the activated sludge in the presence of a magnetic field under low temperature, and then treating grille-filtered food industry wastewater after the reactor runs stably. The treatment process improves the reactor sludge load and organic load, shortens wastewater retention time and reduces running cost.

Figure 1:
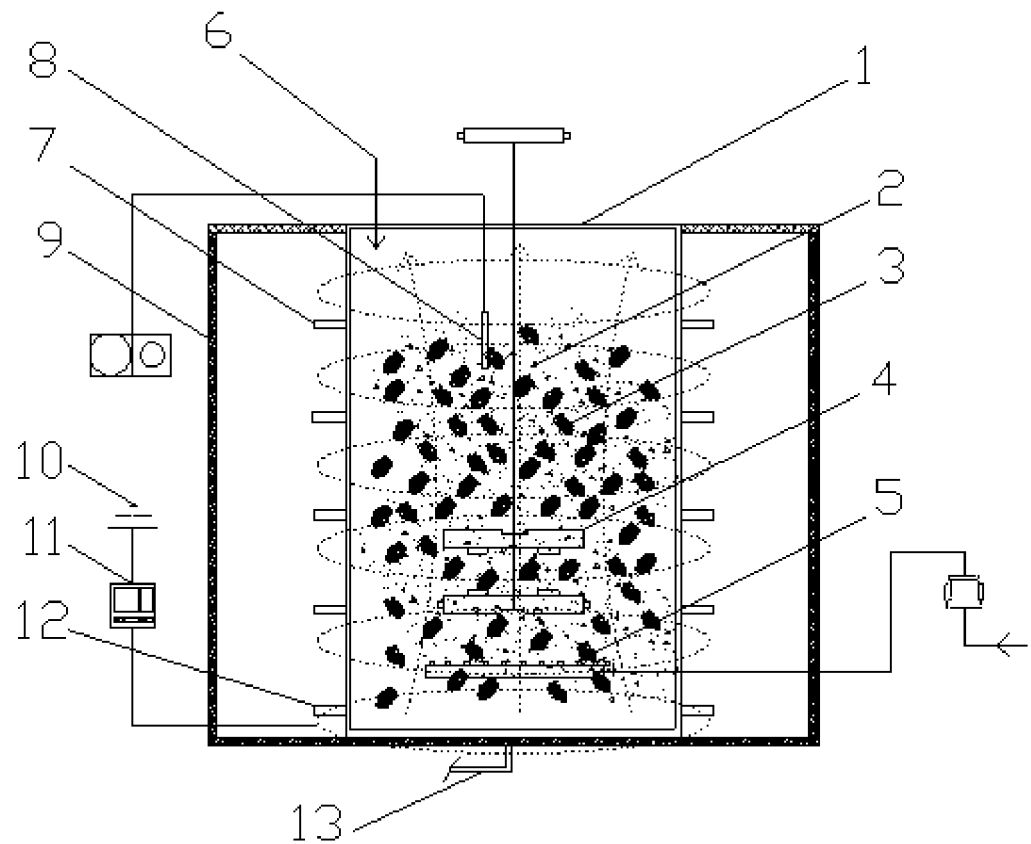
FIG. 1 shows a schematic structure of a device for sewage treatment in accordance with one embodiment of the invention.

In the drawings, the following reference numbers are used: 1. Reactor; 2. Magnetic powder; 3. Activated sludge; 4. Stirrer; 5. Aeration device; 6. Water inlet; 7. Water outlet; 8. Magnetic field tester; 9. Iron cover; 10. Power supply; 11. Transformer; 12. Spiral coil; 13. Sludge outlet.

DETAILED DESCRIPTION OF THE EMBODIMENTS

For further illustrating the invention, experiments detailing a device and a method of sewage treatment using a variable magnetic field are described below. It should be noted that the following examples are intended to describe and not to limit the invention.

As shown in FIG. 1, the invention provides a device for sewage treatment using a variable magnetic field. A magnetic field generator is installed outside of a magnetic powder-intensified activated sludge (MPIAS) reactor 1. The MPIAS reactor comprises a stirrer 4, an aeration device 5, magnetic powder 2, activated sludge 3, a water inlet 6, a water outlet 7, and a sludge outlet 13. The magnetic field generator comprises a magnetic field tester 8, an iron cover 9, a power supply 10, a transformer 11, and a spiral coil 12. The spiral coil 12 loops around an outer surface of the reactor and the iron cover 9 surrounds the periphery and the bottom of the spiral coil 12.

The spiral coil 12 is made of copper material, and the number of turns is determined according to the required magnetic field strength. A variable magnetic field is formed by connecting the spiral coil 12 with the power supply 10 and adjusting the transformer 11. The magnetic field magnitude and direction are controlled by adjusting current intensity and direction in the spiral coil 12.

The iron cover 9 has magnetic conductivity and can reduce the diffusion of the external magnetic field for prevention of interference with other devices.

Detailed description of the invention will be given below in conjunction with accompanying drawings.

EXAMPLE 1

As shown in FIG. 1, a sewage treatment device built in a sewage treatment plant comprises a magnetic powder intensified activated sludge (MPIAS) reactor 1. The MPIAS reactor comprises a stirrer 4, an aeration device 5, magnetic powder 2, activated sludge 3, a water inlet 6, a water outlet 7, and a sludge outlet 13. The water inlet 6 is disposed at the upper end of the reactor 1, the water outlet 7 is disposed on the side wall and the sludge outlet 13 is disposed at the lower end. The reactor 1 is provided with the stirrer 4 and the aeration device 5. The reactor 1 is filled with magnetic powder 2 and activated sludge 3. The magnetic powder 2 is prepared by selecting natural magnetite $Fe_3O_4$ as a magnetic seed, finely grinding the magnetic seed to have a particle size of 8-10 microns, and purifying to have a purity of 99.5% using a weak magnetic separator.

The periphery of the reactor 1 is provided with a magnetic field generator. The magnetic field generator comprises a magnetic field tester 8, an iron cover 9, a power supply 10, a transformer 11 and a spiral coil 12. The spiral coil 12 made of copper material loops evenly around the outer surface of the reactor 1. The spiral coil 12 is connected with the transformer 11 and the power supply 10 in sequence. The iron cover 9 surrounds the periphery and the bottom of the reactor 1, and the magnetic field tester 8 is disposed within the reactor 1. The thickness of the iron cover 9 is 5 mm.

Figure 2:
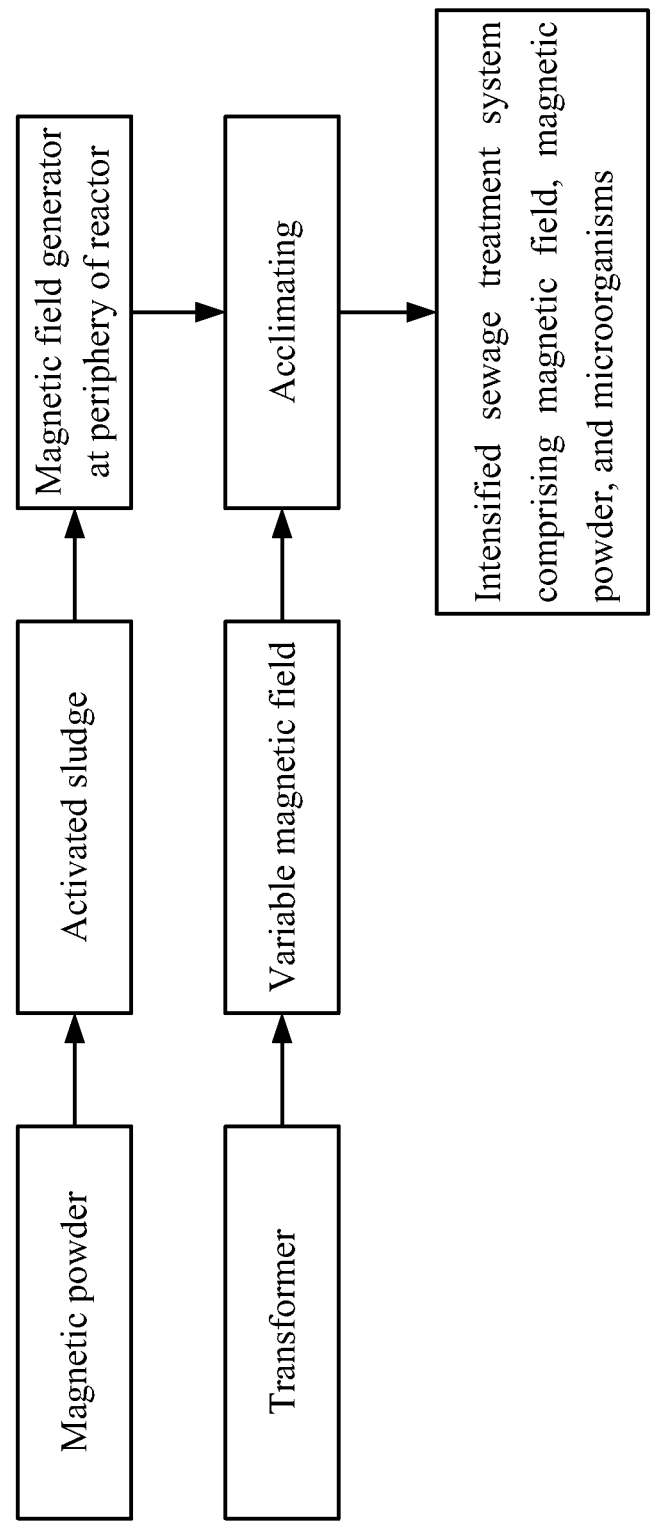
FIG. 2 shows a flow diagram of a method of sewage treatment in accordance with one embodiment of the invention.

As shown in FIG. 2, based on the above device for sewage treatment, a method for sewage treatment is described as follows:

a) disposing the magnetic field generator at the periphery of the reactor 1 and placing the reactor 1 into the spiral coil 12 of the magnetic field generator, and allowing the power supply 10 to be an off-state;
b) placing the activated sludge 3 having a concentration of 4000 mg/L and the magnetic powder 2 in the reactor 1 at 4° C., the addition amount of the magnetic powder 2 being 0.5 g/L, introducing simulated food industry wastewater having an organic load of 0.05 kg/(m³·d) into the reactor, and aerating and stirring the reactor to yield a flocculent mixture of the activated sludge 3 and the magnetic powder 2;
c) culturing the flocculent mixture of the activated sludge 3 and the magnetic powder 2 for 15 d, switching on the power supply 10, adjusting the transformer 11 to produce variable currents in the spiral coil 12 and obtain a oscillating magnetic field in the reactor 1; controlling the magnetic field to rise and fall periodically at a constant rate within the range of 50-100 mT, and gradually increasing the organic load of the simulated food industry wastewater to be 1.0 kg/(m³·d) for the acclimation of the activated sludge 3; and
d) acclimating the activated sludge 3 in the reactor 1 for 30 d to achieve a stable running state, introducing food industry wastewater filtered through a grille into the reactor, and controlling the organic load of the food industry wastewater at 1.0 kg/(m³·d) to form a magnetic field—magnetic powder—microorganism intensifying system.

Through the above acclimatation, the reactor 1 runs stably under low temperature conditions. COD removal rate can be increased by 25-30% and the ammonia nitrogen removal rate can be increased by 10-15%.

EXAMPLE 2

The wastewater treatment device is the same as that in example 1 except that the thickness of the iron cover 9 is 8 mm.

As shown in FIG. 2, based on the above device for sewage treatment, a method for sewage treatment is described as follows:
a) disposing the magnetic field generator at the periphery of the reactor 1 and placing the reactor 1 into the spiral coil 12 of the magnetic field generator, and allowing the power supply 10 to be an off-state;
b) placing the activated sludge 3 having a concentration of 5000 mg/L and the magnetic powder 2 in the reactor 1 at 15° C., the addition amount of the magnetic powder 2 being 1.2 g/L, introducing simulated food industry wastewater having an organic load of 0.05 kg/(m³·d) into the reactor, and aerating and stirring (300 rpm) the reactor to yield a flocculent mixture of the activated sludge 3 and the magnetic powder 2;
c) culturing the flocculent mixture of the activated sludge 3 and the magnetic powder 2 for 20 d, switching on the power supply 10, adjusting the transformer 11 to produce variable currents in the spiral coil 12 and obtain a variable magnetic field in the reactor 1; controlling the magnetic field to rise and fall periodically at a constant rate within the range of 200-300 mT, and gradually increasing the organic load of the simulated food industry wastewater to be 1.5 kg/(m³·d) for the acclimation of the activated sludge 3; and
d) acclimating the activated sludge 3 in the reactor 1 for 40 d to achieve a stable running state, introducing food industry wastewater filtered through a grille into the reactor, and controlling the organic load of the food industry wastewater at 2.0 kg/(m³·d) to form a magnetic field—magnetic powder—microorganism intensifying system.

Through the above acclimatation, the reactor 1 runs stably under low temperature conditions. COD removal rate can be increased by 30-35% and the ammonia nitrogen removal rate can be increased by 15-20%.

EXAMPLE 3

The wastewater treatment device is the same as that in example 1 except that the thickness of the iron cover 9 is 7 mm.

As shown in FIG. 2, based on the above device for sewage treatment, a method for sewage treatment is described as follows:
a) disposing the magnetic field generator at the periphery of the reactor 1 and placing the reactor 1 into the spiral coil 12 of the magnetic field generator, and allowing the power supply 10 to be an off-state;
b) placing the activated sludge 3 having a concentration of 4500 mg/L and the magnetic powder 2 in the reactor 1 at a temperature of 10° C., the addition amount of the magnetic powder 2 being 1.0 g/L, introducing simulated food industry wastewater having an organic load of 0.05 kg/(m³·d) into the reactor, and aerating and stirring (250 rpm) the reactor to yield a flocculent mixture of the activated sludge 3 and the magnetic powder 2;
c) culturing the flocculent mixture of the activated sludge 3 and the magnetic powder 2 for 17 d, switching on the power supply 10, adjusting the transformer 11 to produce variable currents in the spiral coil 12 and obtain a variable magnetic field in the reactor 1; controlling the magnetic field to rise and fall periodically at a constant rate within the range of 100-200 mT, and gradually increasing the organic load of the simulated food industry wastewater to be 1.2 kg/(m³·d) for the acclimation of the activated sludge 3; and
d) acclimating the activated sludge 3 in the reactor 1 for 35 d to achieve a stable running state, introducing food industry wastewater filtered through a grille into the reactor, and controlling the organic load of the food industry wastewater at 1.5 kg/(m³·d) to form a magnetic field—magnetic powder—microorganism intensifying system.

Through the above acclimatation, the reactor 1 runs stably under low temperature conditions. COD removal rate can be increased by 28-33% and the ammonia nitrogen removal rate can be increased by 13-18%.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A device for sewage treatment, comprising:
a) a reactor, the reactor comprising an upper end, a side wall, a lower end, and a bottom;
b) a stirrer;
c) an aeration device; and
d) a magnetic field generator, the magnetic field generator being disposed at a periphery of the reactor;

wherein:
the reactor comprises a water inlet at the upper end, a water outlet on the side wall, and a sludge outlet at the lower end;
the stirrer and the aeration device are disposed in the reactor;
the reactor is adapted to be filled with magnetic powder, wastewater, and activated sludge;
the magnetic field generator comprises a magnetic field tester, an iron cover, a power supply, a transformer, and a spiral coil;
the spiral coil loops around an outer surface of the reactor;
the transformer, the spiral coil, and the power supply are connected in sequence;
the transformer is adapted to generate a variable magnetic field in the reactor by generating variable currents in the spiral coil, wherein the strength of the variable magnetic field periodically increases and decreases;
the iron cover surrounds the periphery and the bottom of the reactor; and
the magnetic field tester is disposed within the reactor.

2. The device for sewage treatment of claim 1, wherein the spiral coil is made of copper.

3. A method of sewage treatment using the device of claim 1, the method comprising the steps of:
(a) disposing the magnetic field generator at the periphery of the reactor and placing the reactor into the spiral coil of the magnetic field generator, and allowing the power supply to be in an off-state;
(b) placing the activated sludge and the magnetic powder in the reactor at a temperature of between 4 and 15° C., introducing wastewater comprising organic compounds into the reactor, controlling a ratio of the activated sludge to the wastewater to be between 4 g:1 L and 5 g:1 L, controlling a ratio of the magnetic powder to the wastewater to be between 0.5 g:1 L and 1.2 g:1 L, increasing a concentration of the organic compounds in the wastewater by 0.05 kg/m$^3$ per day, and aerating and stirring the reactor to yield a flocculent mixture of the activated sludge and the magnetic powder;
(c) culturing the flocculent mixture of the activated sludge and the magnetic powder for 15-20 days, switching on the power supply, controlling the magnetic field strength to periodically increase and decrease within the range of 50-300 mT, and increasing a concentration of the organic compounds in the wastewater by 1.0-1.5 kg/m$^3$ per day for the acclimation of the activated sludge; and
(d) acclimating the activated sludge in the reactor for 30-40 days to achieve a stable running state, and introducing wastewater into the reactor, and increasing a concentration of the organic compounds in the wastewater by 1.0-2.0 kg/m$^3$ per day.

4. The method of claim 3, wherein the magnetic powder is prepared by selecting magnetite $Fe_3O_4$ as a magnetic seed, finely grinding the magnetic seed to have a particle size of less than 10 microns, and purifying the magnetic seed using a weak magnetic separator to have a purity of greater than 99%.

* * * * *